Feb. 27, 1951            G. H. COOK            2,543,354
OPTICAL OBJECTIVE OF THE TELEPHOTO TYPE
Filed Jan. 3, 1950
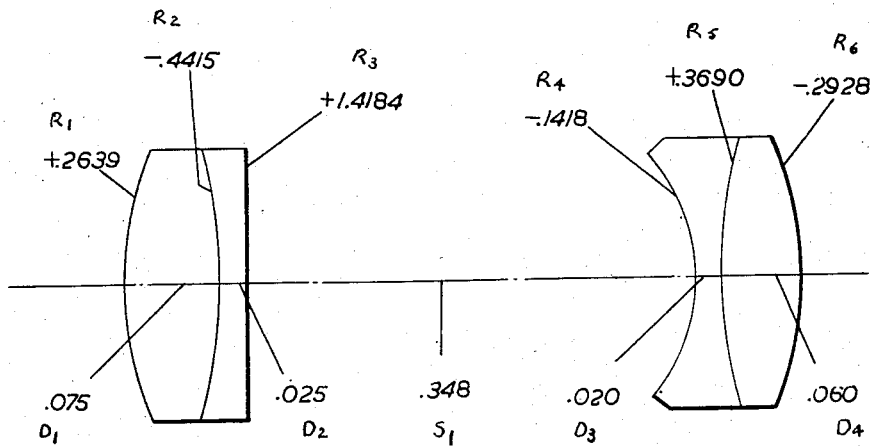
Inventor
Gordon H. Cook
By Emery, Holcombe & Olan
Attorney Patented Feb. 27, 1951

2,543,354

UNITED STATES PATENT OFFICE 2,543,354

OPTICAL OBJECTIVE OF THE TELEPHOTO TYPE

Gordon Henry Cook, Leicester, England, assignor to Taylor, Taylor & Hobson Limited, Leicester, England, a company of Great Britain Application January 3, 1950, Serial No. 136,500
In Great Britain January 5, 1949

15 Claims. (Cl. 88—57)

This invention relates to an optical objective of the telephoto type, corrected for spherical and chromatic aberrations, coma, astigmatism and field curvature, and comprising a rear divergent doublet component having its front and rear surfaces concave to the front, separated by an air space from a front convergent doublet component having its outer surfaces convex to the front and its internal contact concave to the front, the material of the front element of the front component having lower mean refractive index and higher Abbé V number than that of the rear element thereof, the air separation between the two components being greater than the clear diameter of the front surface of the objective and less than twice such diameter, the clear diameter being defined as the equivalent focal length of the objective divided by the relative aperture or $f$ number of the objective.

It is to be understood that the terms "front" and "rear" as herein used relate to the side of the objective respectively nearer to and further from the longer conjugate, in accordance with the usual convention.

Known telephoto objectives of this simple type have suffered seriously from distortion and oblique colour and also from zonal spherical aberration, and the correction of these aberrations has hitherto involved the use of a more complicated type of objective. The present invention has for its object to provide a much better correction for these aberrations than has hitherto been achieved with simple constructions, without impairing the corrections for the other aberrations.

In the objective according to the present invention the rear doublet component has a collective internal contact convex to the front and with radius of curvature between .3 and .4 times the equivalent focal length of the objective, the material of the rear element of this component having mean refractive index exceeding that of the associated front element by between .09 and .16 and Abbé V number less than that of the front element by between 10 and 16.

It should be made clear that the term "internal contact" is used herein and in the appended claims, in preference to the phrases "internal contact surface" and "internal contact surfaces" hitherto more usually employed in patent specifications in order to avoid the inherent ambiguity and confusion which has always been present in such phrases, and is intended to mean the assemblage of the pair of cooperating surfaces within a compound component whether cemented or in the form of what is usually known as a "broken contact," wherein the two cooperating contact surfaces have slightly different radii of curvature. A reference herein to the radius of curvature of an internal contact is to be understood in the case of a cemented contact to mean the actual radius of curvature of each of the cooperating surfaces and in the case of a broken contact to mean the harmonic mean between the actual radii of curvature of the two cooperating surfaces.

To assist in correcting zonal spherical aberration, the axial air space between the two components is made somewhat larger than usual in this type of telephoto objective and preferably lies between .3 and .4 times the equivalent focal length of the objective.

The rear surface of the front doublet component preferably has radius of curvature between 1.0 and 2.0 times the equivalent focal length of the objective. The internal contact in such front component is preferably dispersive with radius of curvature between .4 and .5 times such equivalent focal length, the mean refractive index across such contact lying between .08 and .15 and the Abbé V number difference between 16 and 28.

The mean refractive index of the material of the front element of each doublet preferably exceeds 1.54. Conveniently, the overall axial length of the objective between the front surface of the front doublet and the back focal plane lies between .8 and .9 times the equivalent focal length of the objective. The equivalent focal length of the front doublet component may lie between .6 and .75 times the equivalent focal length of the whole objective.

A preferred example of telephoto objective according to the invention is illustrated in the accompanying drawing, and numeral data for such example are given in the following table, in which $R_1 R_2 \ldots$ represent the radii of curvature of the individual surfaces counting from the front, the positive sign indicating that the surface is convex to the front and the negative sign that it is concave thereto, $D_1 D_2 \ldots$ represent the axial thicknesses of the various elements, and $S_1$ represents the axial air space between the two components. The table also gives the mean refractive indices $n_D$ for the D-line and the Abbé V numbers of the materials used for the individual elements.

| Equivalent focal length 1.000 Relative Aperture F/3.87 | | | |
|---|---|---|---|
| Radius | Thickness or Air Separation | Refractive Index $n_D$ | Abbé V Number |
| $R_1 + .2639$ | $D_1$  .075 | 1.5736 | 52.0 |
| $R_2 - .4415$ | $D_2$  .025 | 1.7007 | 30.2 |
| $R_3 + 1.4184$ | $S_1$  .348 | | |
| $R_4 - .1418$ | $D_3$  .020 | 1.5888 | 61.3 |
| $R_5 + .3690$ | $D_4$  .060 | 1.7181 | 48.1 |
| $R_6 - .2928$ | | | |

In this example the internal contacts in the two doublets are both cemented. The index difference across the dispersive internal contact in the front doublet is .1271, the Abbé V number difference being 21.8. The index difference across the collective internal contact in the rear doublet is .1293, the Abbé V number difference being 13.2.

The back focal plane is distant .345 times the equivalent focal length of the objective behind the rear surface $R_6$, so that the overall axial length from the front surface $R_1$ to such back focal plane is .873 times such equivalent focal length.

The equivalent focal length of the front doublet alone is .67 times the equivalent focal length of the whole objective.

What I claim as my invention and desire to secure by Letters Patent is:

1. A telephoto objective corrected for spherical and chromatic aberrations, coma, astigmatism and field curvature, and comprising a front convergent doublet component having its outer surfaces convex to the front and its internal contact concave to the front, and a rear divergent doublet component separated by an air space from the front component and having its outer surfaces concave to the front and its internal contact collective and convex to the front with radius of curvature between .3 and .4 times the equivalent focal length of the objective, the material of the front element of each component having lower mean refractive index and higher Abbé V number than that of the rear element of the same component, the mean refractive index difference across the contact in the rear component lying between .09 and .16 whilst the Abbé V number difference across such contact lies between 10 and 16, the air separation between the two components being greater than the clear diameter of the front surface of the objective and less than twice such diameter, the clear diameter being defined as the equivalent focal length of the objective divided by the relative aperture or $f$ number of the objective.

2. A telephoto objective corrected for spherical and chromatic aberrations, coma, astigmatism and field curvature, and comprising a front convergent doublet component having its outer surfaces convex to the front and its internal contact concave to the front, and a rear divergent doublet component separated from the front component by an axial air space between .3 and .4 times the equivalent focal length of the objective and having its outer surfaces concave to the front and its internal contact collective and convex to the front with radius of curvature between .3 and .4 times the equivalent focal length of the objective, the material of the front element of each component having lower mean refractive index and higher Abbé V number than that of the rear element of the same component, the mean refractive index difference across the contact in the rear component lying between .09 and .16 whilst the Abbé V number difference across such contact lies between 10 and 16.

3. A telephoto objective corrected for spherical and chromatic aberrations, coma, astigmatism and field curvature, and comprising a front convergent doublet component having its front surface convex to the front and its internal contact concave to the front whilst its rear surface is convex to the front with radius of curvature between 1.0 and 2.0 times the equivalent focal length of the objective, and a rear divergent doublet component separated by an air space from the front component and having its outer surfaces concave to the front and its internal contact collective and convex to the front with radius of curvature between .3 and .4 times the equivalent focal length of the objective, the material of the front element of each component having lower mean refractive index and higher Abbé V number than that of the rear element of the same component, the mean refractive index difference across the contact in the rear component lying between .09 and .16 whilst the Abbé V number difference across such contact lies between 10 and 16, the air separation between the two components being greater than the clear diameter of the front surface of the objective and less than twice such diameter, the clear diameter being defined as the equivalent focal length of the objective divided by the relative aperture or $f$ number of the objective.

4. A telephoto objective as claimed in claim 3, in which the axial air space between the two components lies between .3 and .4 times the equivalent focal length of the objective.

5. A telephoto objective as claimed in claim 4, in which the internal contact in the front component is dispersive with radius of curvature between .4 and .5 times the equivalent focal length of the objective, the mean refractive index difference across such contact lying between .08 and .15 and the Abbé V number difference between 16 and 28.

6. A telephoto objective as claimed in claim 1, in which the internal contact in the front component is dispersive with radius of curvature between .4 and .5 times the equivalent focal length of the objective, the mean refractive index difference across such contact lying between .08 and .15 and the Abbé V number difference between 16 and 28.

7. A telephoto objective as claimed in claim 2, in which the internal contact in the front component is dispersive with radius of curvature between .4 and .5 times the equivalent focal length of the objective, the mean refractive index difference across such contact lying between .08 and .15 and the Abbé V number difference between 16 and 28.

8. A telephoto objective as claimed in claim 3, in which the internal contact in the front component is dispersive with radius of curvature between .4 and .5 times the equivalent focal length of the objective, the mean refractive index difference across such contact lying between .08 and .15 and the Abbé V number difference between 16 and 28.

9. A telephoto objective as claimed in claim 1, in which the overall axial length of the objective from the front surface of the front component to the back focal plane lies between .8 and .9 times the equivalent focal length of the objective.

10. A telephoto objective as claimed in claim 2, in which the overall axial length of the objective from the front surface of the front component to the back focal plane lies between .8 and .9 times the equivalent focal length of the objective.

11. A telephoto objective as claimed in claim 3, in which the overall axial length of the objective from the front surface of the front component to the back focal plane lies between .8 and .9 times the equivalent focal length of the objective.

12. A telephoto objective as claimed in claim 1, in which the equivalent focal length of the front component lies between .6 and .75 times the equivalent focal length of the whole objective.

13. A telephoto objective as claimed in claim 2, in which the equivalent focal length of the front component lies between .6 and .75 times the equivalent focal length of the whole objective.

14. A telephoto objective as claimed in claim 3, in which the equivalent focal length of the front component lies between .6 and .75 times the equivalent focal length of the whole objective.

15. A telephoto objective having numerical data substantially as set forth in the following table wherein $R_1R_2$ . . . represent the radii of curvature of the individual surfaces, the positive sign indicating that the surface is convex to the front and the negative sign that it is concave thereto, $D_1D_2$ . . . represent the axial thicknesses of the individual elements, and $S_1$ represents the axial air separation between the components:

| Equivalent focal length 1.000 Relative Aperture F/3.87 | | | |
|---|---|---|---|
| Radius | Thickness or Air Separation | Refractive Index $n_D$ | Abbé V Number |
| $R_1+ .2639$ | $D_1$ .075 | 1.5736 | 52.0 |
| $R_2- .4415$ | $D_2$ .025 | 1.7007 | 30.2 |
| $R_3+1.4184$ | $S_1$ .348 | | |
| $R_4- .1418$ | $D_3$ .020 | 1.5888 | 61.3 |
| $R_5+ .3690$ | $D_4$ .060 | 1.7181 | 48.1 |
| $R_6- .2923$ | | | |

GORDON HENRY COOK.

REFERENCES CITED

The following references are of record in the file of this patent:

UNITED STATES PATENTS

| Number | Name | Date |
|---|---|---|
| 873,898 | Rudolph et al. | Dec. 17, 1907 |

FOREIGN PATENTS

| Number | Country | Date |
|---|---|---|
| 1,185 | Great Britain | of 1914 |
| 151,507 | Great Britain | Sept. 30, 1920 |
| 536,556 | Great Britain | May 19, 1941 |
| 363,499 | France | May 7, 1906 |